United States Patent
Hinderling

(10) Patent No.: US 11,933,632 B2
(45) Date of Patent: Mar. 19, 2024

(54) SURVEYING DEVICE WITH A COAXIAL BEAM DEFLECTION ELEMENT

(71) Applicant: HEXAGON TECHNOLOGY CENTER GMBH, Heerbrugg (CH)

(72) Inventor: Jürg Hinderling, Marbach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 369 days.

(21) Appl. No.: 17/178,704

(22) Filed: Feb. 18, 2021

(65) Prior Publication Data
US 2021/0254973 A1 Aug. 19, 2021

(30) Foreign Application Priority Data
Feb. 18, 2020 (EP) .................................... 20158055

(51) Int. Cl.
*G01C 15/00* (2006.01)
*G01C 3/08* (2006.01)
*G02B 26/12* (2006.01)

(52) U.S. Cl.
CPC ............ *G01C 3/08* (2013.01); *G01C 15/004* (2013.01); *G02B 26/123* (2013.01)

(58) Field of Classification Search
CPC ...... G01C 3/08; G01C 15/004; G01C 15/002; G01C 15/00; G02B 26/123; G02B 26/105; G01S 7/481; G01S 7/4817; G01S 17/08
USPC ....................................................... 356/4.01
See application file for complete search history.

(56) References Cited

U.S. PATENT DOCUMENTS

| 9,658,059 B2 * | 5/2017 | Metzler ................. G01S 7/4812 |
| 11,592,292 B2 * | 2/2023 | Mayer ..................... G01S 17/42 |
| 2006/0158423 A1 | 7/2006 | Kern |
| 2006/0245717 A1 | 11/2006 | Ossig et al. |
| 2011/0235018 A1 | 9/2011 | Mori et al. |
| 2015/0029489 A1 | 1/2015 | Metzler et al. |
| 2016/0131745 A1 | 5/2016 | Nordenfelt |
| 2016/0274224 A1 | 9/2016 | Nordenfelt |

(Continued)

FOREIGN PATENT DOCUMENTS

| CN | 1926400 A | 3/2007 |
| CN | 104081156 A | 10/2014 |

(Continued)

OTHER PUBLICATIONS

European Search Report dated Nov. 20, 2020 as received in application No. 20158055.2.

*Primary Examiner* — Daniel L Murphy
(74) *Attorney, Agent, or Firm* — Maschoff Brennan

(57) ABSTRACT

A surveying device with a targeting unit carried by a support, the targeting unit being arranged rotatable relative to a vertical axis and a tilt axis as a first and a second axis of rotation, for emitting a distance measurement beam in an emission direction into free space, the emission direction being variable with respect to the vertical axis and the tilt axis. The device further comprises a beam deflection element such as a partially transparent rotatable mirror, situated in the targeting unit and being rotatable about a deflection axis as a third axis of rotation. The deflection axis is congruent to the tilt axis and the beam deflection element is arranged in such a way in the distance measurement beam path that the emission direction can be varied with respect to the deflection axis.

15 Claims, 3 Drawing Sheets

(56) References Cited

U.S. PATENT DOCUMENTS

2017/0082431 A1   3/2017  Berg
2019/0196017 A1   6/2019  Stutz

FOREIGN PATENT DOCUMENTS

| CN | 104567668 A | 4/2015 |
|---|---|---|
| CN | 204575071 U | 8/2015 |
| CN | 106104204 A | 11/2016 |
| CN | 109507679 A | 3/2019 |
| CN | 110030969 A | 7/2019 |
| DE | 197 107 22 | 10/1997 |
| DE | 199 495 80 | 4/2000 |
| EP | 1314960 | 5/2003 |
| EP | 2 141 450 | 1/2010 |
| EP | 2 219 011 | 8/2010 |
| EP | 2810019 B1 | 12/2014 |
| WO | 2004/036145 | 4/2004 |
| WO | 2013113759 A1 | 8/2013 |

\* cited by examiner

SURVEYING DEVICE WITH A COAXIAL BEAM DEFLECTION ELEMENT

CROSS-REFERENCE TO RELATED APPLICATIONS

This application claims priority to European Patent Application No. 20158055.2 filed on Feb. 18, 2020. The foregoing patent application is herein incorporated by reference.

FIELD OF INVENTION

The present invention relates to a surveying device for beam based measurement of distances to object points and a method for measuring with such a surveying device.

BACKGROUND

Optoelectronic surveying devices for measuring and/or stake-out, using which a distance and/or position is determined or projected using optical radiation, are known in manifold forms. Examples are geodetic surveying devices such as electronic tachymeters, total stations, multi-stations, or laser scanners for geodetic or industrial surveying purposes or laser trackers. These devices share the feature that they comprise at least one radiation source for generating measurement radiation and optical means such as lenses, light conducting fibers, or collimators, by means of which the generated measurement radiation can be emitted into free space in a targeting direction toward an object to be surveyed, because of which these devices are also referred to as so-called free beam sensors. A targeting direction and accordingly an emission direction and respectively a reception direction of the measurement beam are ascertained, for example by means of sensors for angle measurement which are assigned to a deflection mirror or a targeting unit of the system.

The target to be surveyed is, for example, a surface of a natural object or a target designed especially for surveying purposes, for example, a retroreflector. The irradiated object reflects measurement radiation in a diffuse or oriented manner (particularly retro-reflection), so that at least a part of the measurement radiation is reflected onto the measuring device. The measuring instrument has an optoelectronic sensor, which is designed for the time-resolved and/or location-resolved detection of the measurement radiation, for example, a PIN diode, a CMOS chip, or a position-sensitive detector (PSD). The desired measurement variable, for example, a distance value or a 2D/3D coordinate, is determined on the basis of the detected measurement radiation. Various measurement principles are available in this case, for example, phase difference measurement, frequency modulated continuous wave measurement (C-FMCW), intensity modulated runtime measurement (time-of-flight, TOF), or measurement based on the Fizeau principle.

Carrying out a runtime measurement not only on the basis of a single respective detected light pulse or sampled point, but rather using multiple successive or adjacent light pulses and employing them for the measurement is known from the prior art for increasing the detected power and/or improving the signal-to-noise ratio. I.e., multiple light pulses and the object points thus sampled are combined to form one measurement point. Optical measurement radiation is understood in this case as electromagnetic radiation not only in the visible range of the spectrum, e.g. 660 nm, but rather also infrared light, i.e., radiation having a wavelength greater than approximately 700 nm.

Modern surveying instruments such as total stations generally have a compact and integrated design, wherein coaxial distance measuring elements and also computing, control and storage units are usually present in a device. Depending on the expansion stage of the instrument, motorization of the targeting or sighting device and—in the case of the use of retroreflectors (for instance an all-round or 360 degree prism) as target objects—means for automatic target seeking and tracking (Automatic Target Recognition—ATR) can additionally be integrated.

For sighting or targeting the target point to be measured, geodetic measuring devices of the generic type have a telescopic sight, such as e.g. an optical telescope vis a classical or an electronic eyepiece, as sighting device. The telescopic sight is generally rotatable about a vertical axis and about a horizontal tilting axis relative to a base of the measuring device, such that the telescopic sight can be aligned with the point to be measured by focusing, pivoting and tilting. Modern devices can have, in addition to the optical viewing channel, a camera for sighting with angular seconds accuracy, said camera being integrated into the telescopic sight and being aligned for example coaxially or in a parallel fashion. The images or image sequences that can be acquired in this case, in particular a live image, can be represented on a display of an instrument's display control unit and/or of a peripheral device—such as e.g. the data logger—used for remote control. In this case, the optical system of the sighting device can have a manual focus—for example an adjusting screw for altering the position of a focusing optical system—or an autofocus, wherein the focus position is altered e.g. by servomotors. By way of example, such a sighting device of a geodetic measuring device is described in EP 2 219 011. Automatic focusing devices for telescopic sights of geodetic devices are known e.g. from DE 197 107 22 or DE 199 495 80.

Since target objects (e.g. the plumb rods with target mark, such as an all-round prism, which are usually used for geodetic purposes) cannot be targeted sufficiently precisely with the naked eye on the basis of the sighting device despite the 30-fold optical magnification often provided (i.e. not conforming to geodetic accuracy requirements), conventional measuring devices have as standard said ATR- or automatic target tracking-function for prisms serving as target reflector. For this, a further separate ATR illumination source—e.g. a multimode fiber output, which emits optical radiation having a wavelength in the range of 850 nm (e.g. 750 nm to 950 nm)—and a specific ATR sensor (e.g. CCD or CMOS area sensor) sensitive to said wavelength are conventionally additionally integrated in the targeting unit. By way of example, EP 2 141 450 describes a measuring device having a function for automatically targeting a retroreflective target and having an automatic target tracking functionality.

With such modern measuring devices, the coordinates of selected target points can be determined with a very high geodetic precision. What is disadvantageous in this case, however, is that a large-area object measurement e.g. with a total station means a disproportionately high time expenditure—compared with a measuring process of a laser scanner on the object.

3D scanning, on the other hand, in particular is a very effective technology for producing millions of spatial measurement points of objects within minutes or seconds, however with lower accuracy than single target point measurements as described above. Typical measuring tasks are the recording of objects such as gear wheels, wings, ships, or aircraft, and/or the surfaces thereof or objects such as industrial plants, house façades, or historical buildings, but also accident locations and crime scenes. For this purpose, they have to be capable of sweeping the measuring radiation of a distance measuring device (electronic distance meter, EDM) over a surface and simultaneously acquiring direction and distance in relation to the measurement point. Thus, such a device has a beam deflection or sweeping unit, by means of which the measuring radiation can be pivoted around at least one axis, usually two axes aligned perpendicularly to one another, for example, a vertical and horizontal axis. The beam deflector can be implemented in the form of a rotating mirror or alternatively also by other elements suitable for the controlled angle deflection of optical radiation, for example, rotatable prisms, movable light guides, deformable optical components, phased array deflectors, etc. Finally, a so-called 3D point cloud is generated from the distance and the direction information correlated therewith for each point by means of data processing.

In this case, a topography of a scanned structure constitutes a continuous sequence or set of points which describes the surface of the object, or else a corresponding model or a description of the surface. One conventional approach is scanning by means of a laser scanner which in each case acquires the spatial position of a surface point by the distance to the targeted surface point being measured by means of the laser and this measurement being combined with the angle information of the laser emission. From this distance and angle information, the spatial position of the acquired point can be determined and the surface can be continuously measured. Disadvantageously, the coordinates of the point clouds are not related to an external geodetical coordinate system, because dedicated reference marks cannot be accessed by precise pointing. In many cases, in parallel with this purely geometrical acquisition of the surface, image capture by means of a camera is also carried out, which, besides the overall visual view, also provides further information, e.g. regarding the surface texture or colorizing the 3D measurement points by the measured RGB values.

Scanning functions can be integrated into various other devices as additional functions. WO 2004/036145 discloses, for example, a geodetic measuring device which emits a laser beam for distance measurement from its position within the acquired range. Such measuring devices can likewise be modified for acquiring surfaces in a scanning fashion, or be operated without modification. One example thereof is motorized theodolites or total stations. Another measuring instrument with integrated scanning function is disclosed in the document EP1314960. This instrument offers scanning of surfaces or objects but only in a limited field of view given by the angular aperture of a traditional tachymeter telescope.

EP 2810019 B1 discloses a tachymeter or multi-station with a scanning module that can be attached on top of the instrument. By these means of a combination with a scanning module, it is possible to produce a system which inherently unites both the advantages e.g. of a laser scanner, in particular with regard to the measurement speed advantages, and the advantages e.g. of a total station. However, besides the disadvantage of an additional structure in form of the scanning module, a major disadvantage is the fact that due to the arrangement of the module, wherein the scanning module and the single-point measurement unit are located in different frames or mechanical submodules, there are two separate measurement coordinate systems present. Thus, there is the effort of calibration and problem of stability between the two axis systems.

BRIEF DESCRIPTION OF THE INVENTION

It is therefore an object of some aspects of the invention to provide an improved surveying instrument.

It is a further object of some aspects of the invention to provide a surveying instrument with improved single point and scanning measurement properties.

Another object of some aspects of the invention is to provide a surveying instrument with scanning measurement properties delivering point clouds easily referenced to an external coordinate system with a geodetic high precision.

This object is achieved by the realization of the characterizing features of the independent claims. Features that develop the invention in an alternative or advantageous manner can be gathered from the dependent patent claims and also the description including the descriptions of figures. All embodiments of the invention that are illustrated or disclosed in some other way in this document can be combined with one another, unless expressly stated otherwise.

The invention relates to a surveying device such as a total station, multi station or theodolite. The surveying device has a radiation source, e.g. a laser source, for generation of a distance measurement beam and a base defining a vertical axis as well as a support defining a tilt axis, the support being arranged on the base and rotatable relative to the base about the vertical axis as a first axis of rotation. Carried by the support is a targeting unit, preferably a targeting telescope, the targeting unit being arranged rotatable relative to the support about the tilt axis as a second axis of rotation. The targeting unit is for emitting said distance measurement beam in an emission direction into free space. Because of the described mounting of the targeting unit, the emission direction is variable with respect to the vertical axis and the tilt axis.

For measuring the respective relative position of the support with respect to the vertical axis and for measuring the respective relative position of the targeting unit with respect to the tilt axis, the instrument comprises a first and a second angle encoder.

Further, the instrument comprises a beam deflection element, such as a partially transparent rotatable mirror, situated in the targeting unit and being rotatable about a deflection axis as a third axis of rotation. The deflection axis is congruent to the tilt axis. Partially transparent stands here for wavelength selective transmission or reflection. For example, the wavelength of the distance measurement beam is reflected by nearly 100% whereas shorter and longer wavelengths used e.g. for other sensor units are transmitted by nearly 100%.

The beam deflection element is arranged in such a way in the distance measurement beam path that the emission direction can be varied with respect to the deflection axis. For measuring the respective relative position of the beam deflection element with respect to the deflection axis, the instrument comprises a third angle encoder.

Thus, the instrument comprises—in addition to the vertical axis defined by the base—not only one, but two additional (horizontal) axes of rotation. This allows for an additional movement in the vertical plane coaxial to and independent of the tilt. The fast rotation is free with respect to the tilt axis, whereby optionally a rotation about the tilt axis is participated by the deflection axis such that the position of the beam deflection element within the targeting unit or relative to (the other parts of) the targeting unit remains unchanged even if the targeting unit is rotated about the tilt axis. In this sense, the beam deflection element can be coupled to tilt axis, e.g. by a mechanical or magnetic catch ("hardware flange") and/or a steering of a rotation of the beam deflection element about the deflection axis synchronous to a rotation about the tilt axis ("software flange").

Preferably, the tilt axis has high positional precision, for instance with a precision better than 2", and the deflection axis an axis has comparatively low positional precision, e.g. with a precision of 2" to 7". Preferably, the tilt axis serves as a slow axis of rotation and the deflection axis as a fast one.

For example, the deflection axis serves as a scan axis such that in course of a scan functionality an object surface can be scanned based on a continuous sweep of the measurement beam over the object surface by means of (fast, e.g. 100 Hz) rotation of the beam deflection element whilst continuously measuring distance as well as respective relative position of the beam deflection element with respect to the deflection axis. In addition to such a scanning, the surveying instrument provides a single point measurement functionality for coordinative measurement of an object point based on a measured distance to the object point and respective relative positions of the support and the targeting unit with respect to the vertical axis and tilt axis, respectively.

Preferably, the targeting unit comprises a small angle aperture and at least one wide angle aperture. The apertures differ in angle position and angle opening with respect to the tilt axis respectively deflection axis, and the beam deflection element can be rotated in such a way that the distance measurement beam can be emitted through both apertures. Said otherwise, a selection between an emission through the first aperture and through the second aperture is executable by a variation of the position of the beam deflection element with respect to the deflection axis. In other words, the beam deflection element preferably allows for a wide angle range of beam path change (relative to the targeting unit), preferably 360°, allowing for a beam emission through the small aperture and the wide aperture, which can for example be used for scanning purposes needing a great field of view.

The wide angle aperture covers e.g. a field of view of at least 90°, for example 110°, and/or comprises at least two flat windows angularly arranged to each other (for example substantially orthogonal to each other in case of two windows). As an alternatively to a straight aperture structure, the aperture comprises a circular shaped window. The central axes of the small angle aperture and of the wide angle aperture are optionally orthogonal to each other and to the tilt axis resp. deflection axis. As another option, the targeting unit comprises a second wide angle aperture, which may be similar to the first wide angle aperture, situated opposite to the first wide angle aperture with respect to the deflection axis, with the small angle aperture in between).

Preferably, the targeting unit is sized and arranged in such a way that it is rotatable at least 360° about the tilt axis. Hence, the support and the targeting unit are matched to each other in such a way that the targeting unit can be positioned vertically. Alternatively, the tilt axis cannot be rotated indefinitely but its rotation is limited to 360° with a bistable sliding stop such that interface cables can be guided between base and support.

In further developed embodiments, the targeting unit comprises a position sensitive optical sensor for position-resolving light detection. The term is to be understood as any sensor arrangement which allows for determination of a position on the sensor of received target light, such as a position sensitive detector (PSD), charge coupled device (CCD) or complementary metal-oxide-semiconductor (CMOS). Therewith, detection of a position of an impinging light beam is enabled, for example a position of a reflected distance measurement beam, or of a measurement beam originating from an additional light source, e.g. providing light of known wavelength and/or modulation specifically matched to the position sensitive optical sensor. Particularly, the instrument comprises an additional illumination light source, e.g. one or more additional laser sources, for illumination of retroreflective targets and detectable by said position sensitive optical sensor.

Further, the instrument preferably has a fine targeting and target tracking functionality (Automatic Target Recognition ATR). During the fine targeting and target tracking functionality, a deviation between a respective current actual orientation of the target axis and a hypothetical or ideal orientation of the target axis sighting the center of a marking sign (e.g. a retroreflector) in the surveying scene is determined, e.g. from the detected position of a spot of reflected light in an image. The targeting axis can then be oriented for fine targeting and/or tracking of the marking sign using the determined deviation using motorization means of the instrument. The target axis is therefore precisely aligned with the target object and the target axis is continuously tracked to a moving target object by means of the fine targeting and target tracking functionality. During target tracking, the position of the moving target is determined continuously or at very short intervals of time. The measurement/the surveying device follows the movement of the target.

Optionally, the targeting unit comprises an on-axis camera sensor for providing a visual image of a targeting view or field of view of the targeting unit. As another option, the targeting unit comprises an autofocus and/or a zooming unit for focusing with regard to said position sensitive optical sensor and/or said on-axis camera sensor.

As another option, the beam deflection element has a spectral selective optical coating of, whereby the coating is reflective for the measurement radiation and at least partly transparent for ambient light, laser light of a laserpointer and/or target illumination light. For example, a dielectric coating is highly reflective for wavelength of 660 nm (distance measurement radiation wavelength) and transparent for ambient light, infrared light and green light. Ambient light, IR-light and green light thus is not (severely) blocked by the beam deflection element and can pass (substantially) unhindered to respective optical sensors (such as RGB-sensor or ATR-sensor) or from light sources (such as a laserpointer) situated "behind" the deflection element in the targeting unit. The measurement radiation source, however, is preferably not situated in the targeting unit but in the support. Optionally, the instrument further comprises an optical divergence element, preferably situated in the support, too, and switchable into the beam path for a change of divergence of the distance measurement beam as an adaption to different measurement/target conditions. Particularly, all beam forming elements necessary for a scanning use of the beam are situated in the support, wherefore the beam entering the targeting unit is already "tailor made" for static or slow measurements such as pointing or tracking and for highly dynamic measurements such as surface scanning.

Preferably, the measurement beam path has a common crossing point with the vertical axis and tilt axis. Thus, the distance measurement beam is coaxial and there is no parallax.

As another option, the instrument provides a calibration functionality for compensation of deviations from an ideal orientation of the emission direction with an emission direction measurement using a calibrated position sensitive optical sensor (preferably said position sensitive optical sensor described above) situated in the targeting unit or an emission direction measurement unit situated in the base and/or support. So at any time, the instrument can be calibrated by the user to guarantee highest measurement accuracy.

The present invention relates also to a method for measuring with a surveying device such as a total station, multi station or theodolite, with generating a distance measurement beam, emitting the distance measurement beam into free space in an emission direction and varying the emission direction with respect to a vertical axis as a first axis of rotation and a tilt axis as a second axis of rotation. Further, there is a determining of the emission direction based on a measured relative position with respect to the vertical axis and a measured relative position with respect to the tilt axis.

In addition, there is a variation of the emission direction with respect to a deflection axis as a third axis of rotation, the deflection axis being congruent to the tilt axis, and a determination of the emission direction based on a measured relative position with respect to the deflection axis.

Some aspects of the present invention provide the advantage that the emission of the distance measurement beam can be additionally varied compared to the state of the art. The beam can be deflected independently of the tilt (vertical orientation) of the targeting unit or in addition to a emission direction variation effected by tilt of the targeting unit, whereby the beam deflection element resp. the third axis of rotation is arranged such that all or every measured object point(s), independently of the emission direction, are directly referenced to or collected in one and the same coordinate system.

The beam deflection element resp. the third axis of rotation preferably allows a fast rotation of the beam direction wherefore an optical scanning capability is provided at high speed, in addition to a single point measurement capability. Both the single points and a resulting scanning point cloud thereby are measured in the same reference system, wherefore there is inherently no possibility of any shift or error between reference systems as only one is needed or used. Thus, different EDM-measurement modes can be provided, for instance fast single point measurements, precise singe point measurements, target tracking (e.g. at of a target such as a pole for stake out and scanning (e.g. with a point acquisition speed of 1 k to 1000 kPTs/s).

Some aspects of the present invention also provide the advantage of enabling different applications as for referencing the instrument immediately to an external coordinate system by pointing to known reference targets, and for collecting or staking out of single coordinate points, and for scanning a scene to create 3D point clouds. All these data can be directly referenced to a common external or global coordinate system. Thus, for example by targeting reference marks measured as single points and scanning surfaces comprising these reference marks, the referential precision of a point cloud can be substantially improved, e.g. reaching precision up to 1 mm compared to precision in the cm-range according to the state of the art.

In preferred embodiments with a beam deflection element with partially transparent properties, additional functions such as laser pointing capability, ATR-functionality or on-axis sighting are provided in an advantageous manner, by according means such as an ATR-sensor of the targeting unit. Thereby, the present invention enables tracking even of fast moving targets wherein not only angular directions to the target can be continuously determined (using the ATR-sensor), but the beam deflection element allows for a continuous measurement of distance with the EDM-beam, too. With known instruments wherein the distance beam direction is only changeable using the tilt axis, the distance measurement beam contact to a moving target, e.g. a retroreflector, is likely to be lost as rotation is often too slow to follow the target and the beam divergence is very small (e.g. Now, a robust tracking of such a target with the beam is possible.

BRIEF DESCRIPTION OF THE DRAWINGS

The surveying instrument and the method according to some aspects of the invention are described or explained in more detail below, purely by way of example, with reference to working examples shown schematically in the drawing. Identical elements are labelled with the same reference numerals in the figures. The described embodiments are generally not shown true to scale and they are also not to be interpreted as limiting the invention.

Specifically.

DETAILED DESCRIPTION

Figure 1:
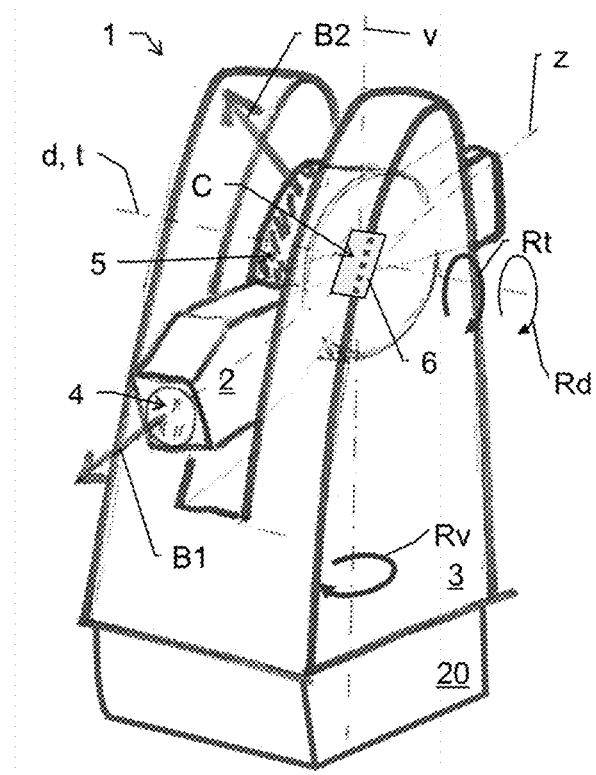
FIG. 1 illustrates a first example of a surveying instrument in a 3D-view.

FIG. 1 illustrates in a 3D-view a first example of a surveying instrument 1 according to the invention. FIG. 1 shows the instrument 1 having a base 20 and a support 3 connected to the base 20, whereby the base 20 can be attached to a tripod or the like (not shown). The support 3 is rotatable with respect to the base about a first or vertical axis v. Further, the device 1 comprises a targeting or sighting unit 2 such as a targeting or sighting telescope supported by support 3 as shown. The targeting means 2 defines a targeting axis z, whereby the targeting unit 2 and t herewith the targeting axis z are rotatable relative to the support 3 about a second, horizontal or tilt axis t.

Preferably, the dimensions of telescope 2 and support 3 are matched in such a way that the telescope 2 can be brought in a fully vertical position and for example be rotated about 360° or even more. In other words, the distance from tilt axis t to the inner "bottom" of support 3 is at least half of the telescope's length (if the telescope 2 is suspended in its geometrical centre) or said distance is longer than any of both of the "arms" of the telescope 2 seen from the tilt axis t. Thus, as known in prior art, a first rotation Rv about vertical axis v is enabled as well as a second rotation Rt about tilt axis t for a change of the sighting or targeting direction z of telescope 2. Therewith, the emission direction of an optical surveying beam B1, exiting the targeting unit 2 by (first or small angle) aperture 4, the aperture 4 being situated at the front of the targeting unit 2 as shown, can be varied. The current direction is determined with respective angle encoders for each axis v, t (not shown).

According to the invention, the instrument 1 comprises a beam deflection element 6, e.g. a mirror, situated in the targeting unit 2 at the crossing point C of the vertical axis v and tilt axis t. The mirror 6 is rotatable about a third or deflection axis d, the deflection axis d being congruent to tilt axis t but independently of tilt axis t. That is, that the emission direction of the surveying beam can not only be altered by rotation Rv about the first axis v and (orthogonal thereto) by rotation Rt of the telescope 2 about the second axis t, but in addition by a coaxial rotation Rd of the mirror 6 about deflection axis d. Preferably, the beam deflection element 6 thereby is coupled to the tilt axis t in such a way that it rotates equally to the targeting unit 2 if the targeting unit 2 is rotated about tilt axis t, i.e. the mirror's position relative to the telescope 2 remains unchanged if not actively rotated about the deflection axis d. This is for example enabled by some sort of mechanical or magnetic catch which pulls the mirror 6 along according to a rotation Rt of the telescope 2. In addition or alternatively, steering of mirror 6 is controlled in such a way that it is rotated about deflection axis d synchronous to a rotation Rt of the telescope 2 about tilt axis t (e.g. a controller steers both axis d, t simultaneous the same way).

Because of the deflection element 6, the emission direction of the measurement beam is not bound to the targeting direction z as defined by the position of the targeting unit 2 but can be additionally varied, whereby the rotational position of the beam deflection element 6 and thus the current emission direction is determined using an additional angle encoder for the deflection axis d (not shown). Thus, the beam can for example as shown in the figure be emitted through a second aperture 5 a beam B2, e.g. in an 90° angle to the targeting direction z resp. to the first beam direction B1 as shown. The second aperture 5 preferably is a wide angle aperture, for instance allowing a field of view of at least 90°, e.g. about 110°. The beam deflection element 6 by the additional degree of freedom about third rotation axis d allows for a selection between an emission of the surveying beam B1 through the first aperture 4 and through second aperture 5 (beam B2).

The deflection axis d thereby is used as a fast axis of rotation (in contrast to the tilt axis t as a slow axis of rotation) allowing in particular together with said wide angle aperture 5 for a fast swivel of the surveying beam B2 through space (in the vertical plane; whilst slowly rotating support 3 in the horizontal plane), which can be used for scanning an object's surface as in principle known in the art. The wide angle aperture 5 thereby can be positioned such that a desired orientation of the aperture's field of view is maintained by fixing the tilt axis t or the telescope 2 can in addition be rotated about tilt axis t, allowing for an additionally enlarged scanning window (greater than the field of view of aperture 5). As another option, all apertures 4, 5 are used as beam exit (and entry) windows for scanning.

Therefore, in this setup, the device 1 can be used in principle as a stationary geodetic device like a total station or theodolite and in addition as a laser scanner, for example for geodetic surveying or measuring purposes and/or in indoor or outdoor construction works. As a further example, the device 1 can be used as a point and/or line laser projector, e.g. in form of a laser level or rotary laser or for position true projection of a point, line or geometric shape on an object's surface according to a construction plan or CAD-data or the like, enabling a visual marking of a nominal position such that for instance a construction work can be performed at or according to that nominal position.

The surveying instrument 1 in the example thus has a single point measurement functionality for determining coordinates of single object points, based on the targeting direction z (position of support 3 and telescope 2 with respect to the vertical axis v and horizontal axis t) and a distance determined with measurement beam B1, B2, whereby the deflection element 6 is not rotated relative to the targeting unit 2 (or only slowly, e.g. half of a full rotation per second or slower, or step-by-step if more than one object point is to be measured; such a slow rotation of mirror 6 is effected either in addition to the telescope's rotation or instead of it—an advantage of actively moving the beam deflection element 6 instead of targeting unit 2 even in single point measurement can be energy saving as the mass to be moved is considerably lower).

Above that, instrument 1 has a scan functionality wherein based on continuous sweep of the distance measurement beam B1, B2 by continuous (fast) rotation of mirror 6 about deflection axis d whilst continuously measuring distance with the measurement beam and the mirror's rotational position with respect to deflection axis d (as well as the rotational position with respect to vertical axis v, and—if necessary—with respect to tilt axis t). In this mode measurement rates of more than 1 Meg points per second are possible with a spinning rate of mirror 6 of up to 100 Hz.

Figure 2:
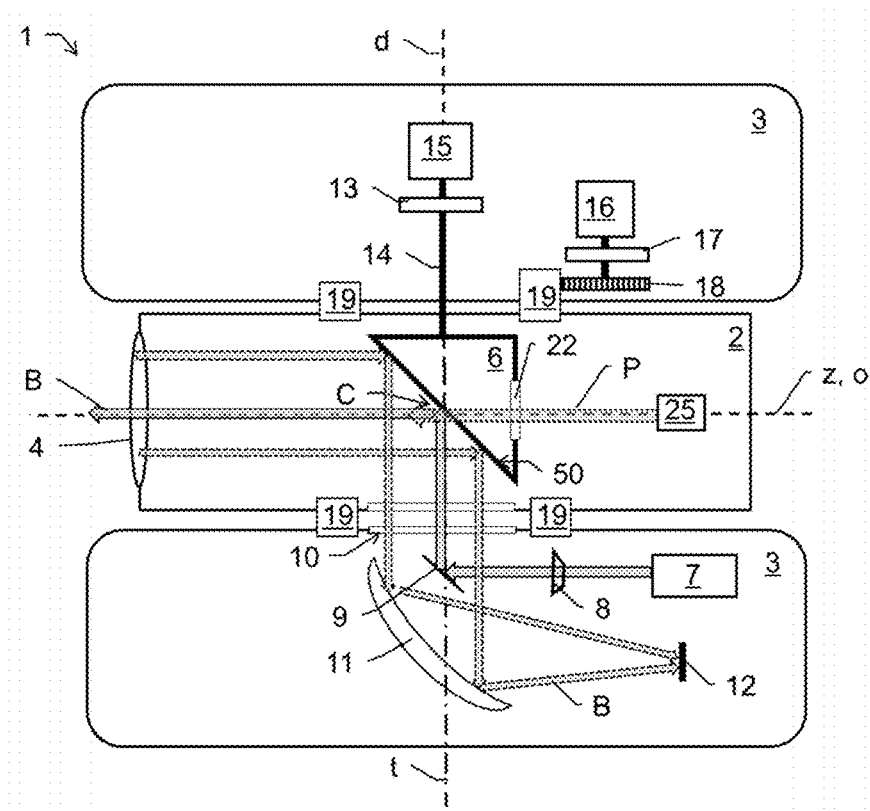
FIG. 2 shows an exemplary embodiment of a surveying instrument in more detail in a bird's eye view.

FIG. 2 shows in a top view another example of a surveying device 1 (without its base). In the middle of the figure, there is the targeting unit 2, girded by the two sides of support 3.

Targeting unit 2 is rotatable about tilt axis t relative to support 3. For example, telescope 2 is supported by a gear rim or some other sort of drive unit. The axis t is well guided by a shaft bearing (indicated in the figure by drawing elements 19) and actuated by drive 16 using a gear wheel 18. The current rotational position is for example measured as depicted by angle sensor 17. By tilting targeting unit 2, the targeting axis z can be varied and thus the emission direction of a measurement beam B. Additionally, a 2D-tilt sensor can be place in the body of the targeting unit 2, allowing for precise determination (arcsec) of the vertical axis relative to the direction of gravity.

Measurement beam B is generated by a radiation or light source 7, e.g. a laser diode, superluminescent light diode (SLED), a fiberlaser, or a laser-diode seeded fiberamplifier, situated in one side of support 3 (bottom of FIG. 2). Regarding lasersafety limits, maximum optical power with lowest hazard level is when using light sources in the wavelength range of 1200 nm to 1800 nm. The beam B is first directed onto a mirror 9 (grey arrow). In this part of the emission beam path, an optical divergence element 8 is situated as depicted in the example for increasing the divergence of the measurement beam B. Preferably, the divergence element 8 is movable such that it can be put into the beam path and taken out from case to case (cf. FIG. 3 below, wherein divergence element is depicted in an off-state), allowing for an adaption to different target types to be measured (retro-reflecting targets with divergence element inserted or diffuse scattering targets with divergence element out of the beam path).

Said mirror 9 turns the beam B around such that it leaves the support 3 and enters the telescope 2 through windows or openings 10. Beam B then hits the beam deflection element 6 which is centered in the centerpoint C of the tilt axis t resp. congruent deflection axis d and the targeting axis z resp. optical axis o of the telescope 2. Hence, the measurement beam path has a common crossing point C with the vertical axis v (see FIG. 1) and tilt axis t. Thus, reflected from the beam deflection element 6 as shown, the beam B is emitted parallax-free and coaxial to the optical axis in the current posture of beam deflection element 6 as shown through aperture 4 (front side of telescope 2). In between beam deflection element 6 and its exit point, additional optics can be placed (not shown) such as beam forming lenses, magnifying lenses or beam expander optics.

The posture of beam deflection element 6 and thus the emission direction of beam B is variable as element 6 can be rotated about deflection axis d. Hence, the emission direction is not bound to the targeting direction z, defined by telescope 2, but can be additionally changed relative to the optical axis o or relative to the telescope 2. For example, the direction of beam B can be changed due to deflection element 6 such that the whole opening angle of aperture 4 can be used. Preferably however, a much greater maximum angle of rotation of emission direction resp. deflection element 6, e.g. 150° in one or both directions from the zero position (targeting direction z) or even fully 360°. Beam B can then be emitted for instance through one or more additional wide angle apertures as shown in FIG. 1.

Rotational posture of beam deflection element 6 is changed by drive 15 situated in one side of support 3 as shown (top of FIG. 2), likewise said tilt axis motor 16. Beam deflection element 6 is connected to drive 15 by a shaft 14 and its rotational position is determined by deflection angle encoder 13. The deflection drive 15 is a fast drive, e.g. allowing for a rotational speed of several hundred or thousand rotations per minute for instance and in particular fast compared to slow drive 16 for the tilt axis t. On the other hand, the precision of the deflection element 6 resp. the precision with respect to the deflection axis d is typically lower than the one of the targeting unit 2 resp. targeting axis z or tilt axis t. For example, the tilt axis precision better than 2", e.g. 1", and the deflection axis precision is lower than that, e.g. between 2" and 7".

Measurement radiation returning from the target or object to be measured (returning beam B indicated by dashed grey arrows) is back reflected from the telescope 2 into the support 3 by deflection element 6. A static parabolic mirror 11 in the support 3 then directs and focusses the returning measurement light B onto an optical sensor 12, where the light B is detected for determining a distance to an object point, e.g. based on Time of Flight or any other principle for opto-electronical distance measurement, for example using real-time wave form digitizer (WFD).

The EDM measurement unit comprising optical, opto-electronic and electronic components is mainly located in the support 3. For precise absolute distance measurement, e.g. with sub-mm accuracy, an internal light path is used for generating reference signals which define precise trigger signals associated with the emission time of the optical radiation emitted to the target. This start signal path is not indicated in the figure but in principle known from the prior art.

In the example, the beam deflection element 6 is partially transparent, e.g. due to a spectral selective optical coating 50 at its front side. This, together with a window, an aberration-correction optics or just an open aperture 22 at its back side allows as shown in the example for light of a pointer beam source 25, situated in the back side of telescope 2, to pass through beam deflection element 6 by selection a transmitting range of coating 50 matched to the wavelength of pointing light P. Alternatively, mirror 6 is partially transparent over a whole wavelength range, e.g. 50% of light is reflected, 50% transmitted. Thus, a pointing laser beam can be emitted coaxial to optical axis o resp. targeting axis z or without parallax, despite the presence of element 6.

Figure 3:
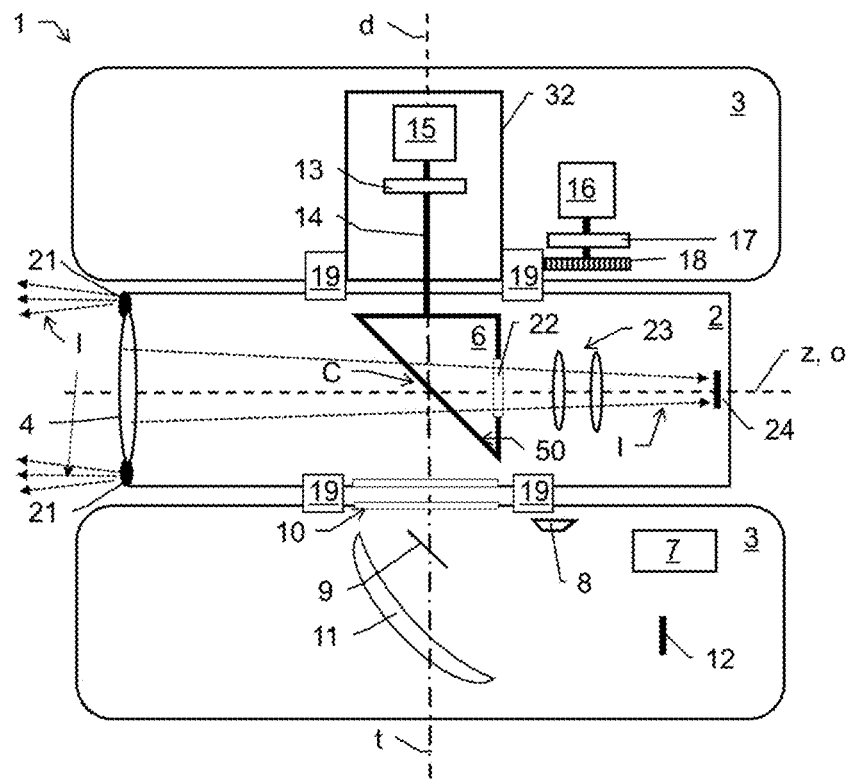
FIG. 3 shows another exemplary embodiment of a surveying instrument in a bird's eye view.

FIG. 3, based on FIG. 2, shows another exemplary embodiment of a surveying instrument 1. For sake of clarity, the indication of the distance measurement beam path as shown in FIG. 2 has been omitted here.

In contrast or addition to the embodiment according to FIG. 2, telescope 2 comprises an additional optical sensor 24. Sensor 24 can detect light passing through telescope 2 due to the transitive properties of beam deflection element 6 described with respect to FIG. 2 (spectral selective optical coating 50 and aperture or window 22). For example, ambient or natural light entering aperture 4 goes (without considerable attenuation) "behind" deflection element 6 and is directed to sensor 24 which is used as a camera chip. Thus, telescope 2 can act as for instance as a camera, providing an on-axis view of the telescope's sight to a user by a display unit of instrument 1 or any device with a display connected to instrument 1. As an addition, telescope 2 comprises an autofocus and/or zooming optical group for adapting focus of telescope 2. As another option, telescope 2 can comprise a separate overview-camera e.g. at the front besides aperture 2 preferably parallel displaced to the telescope's optical axis o.

Additionally or alternatively, sensor 24 is embodied as an ATR-sensor (Automatic Target Recognition) for fine-targeting or tracking of a target such as a retroreflector in course of a ATR-functionality whereas the sensor 24 is a CMOS imaging sensor or an analogue position sensitive detection device, preferably with sensitivity to wavelengths different than said first sensor 12. Therein, a deviation in a received light beam from a zero or ideal position on sensor 24, which therefore is position sensitive (embodied as a position-sensitive detector PSD), is ascertained. The light beam is for example a second laser beam, e.g. generated by one or more additional laser sources (such as light sources 21 shown) situated in the telescope 2, separate from and preferably different with respect to wavelength and/or modulation to the distance measuring beam of beam source 7. Said measurable deviation is used to determine a position difference between the center of a retroreflector or a reflecting tape target and the optical aiming axis o which direction is referenced by the angle sensors of the vertical axis v, the tilt axis t and additional calibration parameters which are given from a previous two-face calibration procedure as known from the prior art. This position or angular direction difference is then used to correct or readjust the orientation of the laser beam on the basis of this discrepancy such that said deviation on the sensor 24 is decreased, in particular is "zero", and hence the telescope or ATR axis is oriented in the direction of the center of the retroreflector or the reflecting tape.

When a so called tracking measurement mode is activated, the distance measurement beam B is activated synchronously to the ATR-sensor. In this mode the travel curve of a moving reflective target can be measured completely in an automatic manner. This is an important method for staking-out data points into the field where a reflector is on top of a pole or a rover. Another dynamic application of this 3D-tracking measurement mode is to measure the trace of a moving construction engine for example a grader or a dozer.

When the laser beam of the rangefinder is locked onto the optical axis o by clamping the mirror 6 to the telescope 2 such that the axis z and axis o are identical, then according to known solutions the readjustment of the pointing direction to the target can only be performed by the telescope body 2. This has some disadvantages because of the acceleration of the large mass. However, the present solution enables that small and fast motions can be carried out by moving the lightweight mirror 6 to keep the rangefinder beam on the reflector target. The present way of readjustment of the laser beam orientation allows continuous target tracking (tracking) of the target object without any interruption of the distance measurement thanks to a fast and permanent alignment of the distance laser beam B within its rather small divergence. Note that the beam divergence (0.15°) of the rangefinder is small compared to the ATR field of view (1.5°) although the optical divergence element 8 is switched into the emission beam path. For the case when the optical divergence element 8 is switched out of the emission path then the laser beam divergence is smallest possible) (<0.01° and thus optimized for reflectorless target measurements. This present configuration offers a tracking process with robust and fast 3D-trace detection method where distance and position of the target point is continuously determined relative to the measuring appliance. In this case, the readjustment can be realized by means of a change of orientation for the spinning mirror 6, which can be moved in a motorized manner and is provided for the purpose of deflecting the laser beam, and simultaneously by pivoting the targeting unit 2 that has the beam-guiding laser optical system.

In the example, the telescope 2 comprises illumination light sources 21 stiffly fixed at its front, for example two or more lasers, VCSELs, or LEDs surrounding the aperture 4 such that their common center or center of gravity is in middle of aperture 4 resp. on optical axis o. Light sources 21 provide illumination light I of the field of view of the ATR, matching the wavelength range of the optical filter of the ATR-receiver e.g. around 850 nm, part of which is reflected by a retroreflective target and directed as a measurement beam onto ATR-sensor 24 as shown in FIG. 3, thus enabling a measurement of a direction to the retroreflective target resp. measurement of a deviation to an ideal or central direction.

The spatial resolving detector 24 can be realized by an imaging CMOS or CCD sensor or an analogue PSD. The illumination light is reflected by reflecting target objects impinges on the area sensor 24. For the case when ATR is realized with an image sensor, then the field of view is to be seen with the reflective target(s) located in the scene. By using a synchronized modulation scheme of the target illuminator(s) 21 combined with a sophisticated image processing pipeline in real-time—preferably realized on FPGA hardware-, then a target of interest can be identified and located, and the alignment of the telescope 2 can be adapted according to the determined location. Depending on the selected measurement mode by the user, only a single automated measurement is done, or a sequence of points in the scene are stake-out or recorded, or a continuous measurement is activated e.g. for tracking a path or a trajectory of a moving vehicle.

As an alternative, sensor 24 is embodied as an area sensor that operates locally in the analogue domain and that can be used to determine a focus for a light distribution on the sensor area. In this case, the output signal from the sensor 24 is produced by means of one or more photosensitive areas and is dependent on the respective position of the focus of ATR-measurement light I. Downstream or integrated electronics can be used to evaluate the output signal and to ascertain the focus. In this case, the position of the focus of the impinging light point can be ascertained very quickly and with a very high resolution. However, the PSD 24 can be used to ascertain only a focus of the light distribution, and not a distribution of a plurality of light points.

The PSD or CMOS-sensor 24 of the ATR unit can be used to determine a deviation in the impingement point of the sensed light I from a servo control zero point, and the deviation can be taken as a basis for readjusting the telescope 2 (and therewith the ATR-unit) and the emitting direction of the distance measurement beam to the target (mainly using the beam deflection element 6). For this purpose and in order to achieve a high level of precision, the field of view of the ATR unit (emitter & receiver) is chosen to be comparatively small compared to a standard camera optics, e.g. about 1° to 3°, i.e. to achieve a high spatial or angular resolution per image pixel. Additionally, because the ATR-illuminator 21 has to illuminate the field of view (FOV) of the ATR receiver, a small FOV increases the irradiance of the target object and result in a higher signal to noise ratio.

Sensing using the ATR takes place coaxially with respect to the measurement axis, as a result of which the sensing direction of the ATR corresponds to the measurement direction. The ATR-based tracking and the fine targeting can be applied at any orientation as long as the reflecting target is inside the FOV of ATR. Distance measurements are only possible, when the distance measurement beam hits the target reflector. The new inventive $2n$ d tilting or deflection axis d enables that the speed of pointing the measurement beam to the target object is much faster than with previous solutions and no lost distance measurements because of missing the target reflector will occur.

Present FIG. 3 depicts also schematically a possibility of coupling the movement of the targeting unit 2 to the beam deflection element 6. Both units are coupled together in the example by flanging a housing 32 of the deflection drive unit to the tilt drive unit, e.g. using the bearing structure 19 as depicted. Such a coupling can be effected e.g. mechanically or by other methods of enabling force between the two units, for example using magnetic forces.

Therefore, if the telescope 2 is rotated, the housing 32 resp. the deflection drive unit is rotated therewith, too, and thus mirror 6 rotates similar to the targeting unit, despite of its free rotation axis d. As one alternative, as already mentioned, drives 15 and 16 are controlled synchronously in such a way that a rotation of telescope 2 driven by motor 16 is copied or evened out by an equal rotation of beam deflection element 6, driven by motor 15.

By setting this synchronous targeting mode, the measurement instrument behaves exactly the same as a traditional total station, so the user has the same possibilities and performances to make his work as hitherto. However, when the new inventive measurement mode is used where the deflection axis d is activated, then the distance measurement beam can be steered and adjusted to the center of signs- or marks with high acceleration and angular speed.

Figure 4:
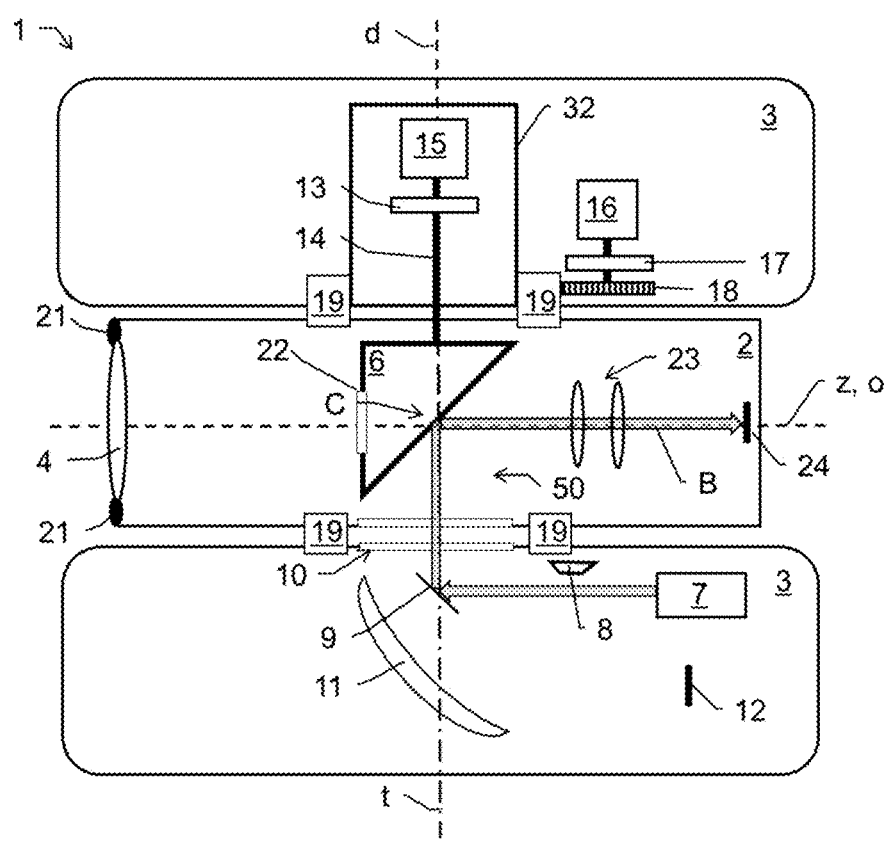
FIG. 4 shows a further exemplary embodiment of a surveying instrument in a bird's eye view.

FIG. 4, based on FIGS. 2 and 3, shows an example for a calibration of the new axis d of instrument 1, using the position sensitive optical sensor 24 of the ATR unit described above. As shown, beam deflection element 6 is positioned such that it is aiming "backwards" (180° rotation compared to the posture depicted in FIGS. 2 and 3). Hence, the measurement beam path is (ideally) going along optical axis o resp. targeting axis z, whilst not in direction to aperture 4 but in direction to sensor 24.

The EDM beam spot's position on the ATR-detector 24 is measured at different directions by moving the telescope 2 together with the scanning mirror 6 to different vertical angles. Then a set of data is collected where the calibration parameters of the EDM laser beam direction to the axis system of the instrument 1 can be deduced. Most relevant parameters comprise angle correction values as for example the horizontal and vertical laser beam angles before the mirror 6, the angle deviations of the fast rotating axis d to the tilting axis t, and the discrepancy of the tilted mirror from 45°. A prerequisite is the precise calibration of the ATR-unit comprising the sensor 24 together with its complete imaging optics. The configuration of instrument 1 allows a real two-face calibration of the ATR-unit due to the fact that the telescope 2 including all optical components defining the ATR-aiming axis z can be freely rotated and set to a first and a second face by aiming to fixedly located targets at adequate distances in the environment of the instrument 1. For calibrating the EDM laser beam direction B, it is also necessary that its wavelength is within the sensitivity range of the sensor 24, e.g. shorter than 1100 nm, for example a wavelength of 660 nm if a CMOS-camera chip is used for sensor 24. In addition, an ATR-targetline-calibration can be done not only at infinity but also at different autofocus positions (optical unit 23) meaning different target distances. Another calibration method of the EDM beam B is described with respect to following FIG. 5.

Figure 5:
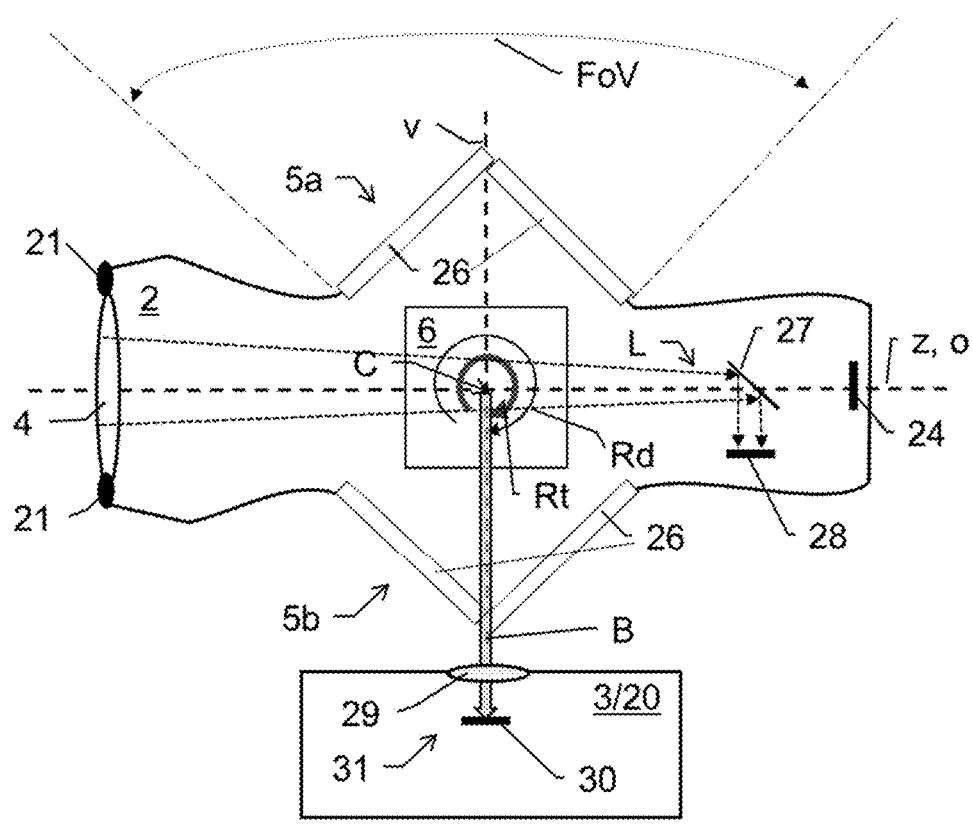
FIG. 5 illustrates a side view of an exemplary surveying device.

FIG. 5 shows a side view of an exemplary targeting unit 2 together with a bottom part of either rotatable support 3 or base 20. In the central crossing point C of the vertical axis v and optical axis o resp. targeting axis z, beam deflection element 6 is arranged, whereby the two horizontal axes of rotation Rt and Rd, which are orthogonal to the drawing plane, are indicated by arrows.

The arrangement and rotatability of beam deflection element 6 enables a deflection of the distance measurement beam B in the v-z-plane independent of a rotation of the telescope 2. Telescope 2 comprises a first wide angle aperture 5a on the "top" and a second wide angle aperture 5b on the "bottom". Thus, the rotated measurement beam B can exit telescope 2 through the windows 26 of these apertures 5a, 5b, in addition to the possible emittance through front aperture 4 in between at the front side. Hence, telescope 2 has openings at three sides, providing some sort of "light or glass house" with a wide range of possible beam emitting directions.

The opening angle of said apertures 5a, 5b is preferably chosen as large as possible in order to cover a maximum field of view (FoV). For example, the FoV of a respective aperture 5a, 5b is 90° at least, e.g. 110°, and for the small angle aperture 4 for instance 1°, 3°, or depending on whether expansion optics is present between aperture 4 and crossing point C and what type it is. In the easiest embodiment there is no expansion optics implemented. Thus, if the telescope 2 is for instance positioned vertically (90°—rotation to the position depicted in FIG. 5), when being rotated by mirror 6 the measurement beam B can easily scan most of the surrounding as a free beam exiting (and entering) through apertures 5a, 5b at both sides (and also through aperture 4 e.g. on top). Thus, a panoramic scan can be performed with the surveying device by rotating it only by 180° around the vertical axis v. So panoramic scans are realized in very short time lasting not more than 100 sec. A complete full dome scan is possible by an according tilt of telescope 2, either such that the FoV of first wide angle aperture 5a and the FoV of the second wide angle aperture 5b together cover the full vertical sector (180°) or by dynamically tilting telescope 2 during the scan.

In the example, each wide angle aperture 5a, 5b comprises two flat windows 26 arranged e.g. substantially orthogonal to each other. Thus, each aperture 5a, 5b is closed roof-like. Such a structure with flat windows 26 is advantageously free of aberration. Preferably the windows are tilted to each other to form a cone or a taper in order to prevent back reflections of the laser beam B into the EDM-receiver. As an alternative to such a straight structure consisting of flat window optics, wide angle apertures 5a, 5b are cylindrically or conically shaped as indicated in FIG. 1, whereby in this case, telescope 2 comprises additional means for optical correction as a convoluted window alters the beam path (like a lens).

As another option, FIG. 5 shows an additional optical sensor 28 in addition to sensor 24, whereby a partially transparent mirror 27 is arranged before them. This arrangement allows for example to direct ambient light L as shown onto optical sensor 28 as a high resolution camera chip (e.g. RGB-sensor) where it can be detected for providing an on-axis view of the telescope as already mentioned. Mirror 27 is designed such that measurement light for said ATR-functionality passes through and reach position sensitive detector 24 (e.g. VGA-BW-CMOS sensor with high frame rate of e.g. 150 Hz and pixel binning). An autofocus system as described with respect to FIG. 3 is then designed to enable focus adjustment both for sensor 24 as well as for sensor 28.

Present FIG. 5 illustrates also a calibration method for calibration of direction angles of the distance measurement beam B in the coordinate system of the surveying instrument, using an emission direction measurement unit either situated in bottom part of rotatable support 3 or situated in base 20 as shown. As shown, a collimator 31 with collimator lens 29 and collimator sensor 30 is located in the NADIR-direction. The EDM measurement beam B emitted through "bottom"-aperture 5b hits the collimation optics 29 and is then detected by a further optical sensor 30 arranged in the bottom part of rotatable support 3 or in the base 20. Such a calibration unit allows to calibrate the direction parameters of the EDM measurement beam B as it is emitted to object space because all optical elements as beam expanders and/or exit windows of the wide angle apertures 5a, 5b are included. Additionally such a calibration unit arranged outside telescope 2 is particularly advantageous if the wavelength of the distance measurement beam B is not within the detection range of the ATR-sensor 24 (e.g. longer than 1100 nm, e.g 1550 nm).

A skilled person is aware of the fact that details, which are here shown and explained with respect to different embodiments, can also be combined in other permutations in the sense of the invention if not indicated otherwise.

What is claimed is:
1. A surveying device comprising:
   a radiation source for generation of a distance measurement beam;
   a base defining a vertical axis;
   a support defining a tilt axis, the support being arranged on the base and rotatable relative to the base about the vertical axis as a first axis of rotation;
   a targeting unit carried by the support, the targeting unit being arranged rotatable relative to the support about the tilt axis as a second axis of rotation, for emitting the distance measurement beam in an emission direction into free space, the emission direction being variable with respect to the vertical axis and the tilt axis;
   a first angle encoder for measuring the respective relative position of the support with respect to the vertical axis;
   a second angle encoder for measuring the respective relative position of the targeting unit with respect to the tilt axis;
   a beam deflection element situated in the targeting unit and being rotatable about a deflection axis as a third axis of rotation, the deflection axis being congruent to the tilt axis and the beam deflection element being arranged in such a way in a distance measurement beam path that the emission direction can be varied with respect to the deflection axis; and a third angle encoder for measuring the respective relative position of the beam deflection element with respect to the deflection axis.

2. The surveying device according to claim 1, further comprising:
a single point measurement functionality for coordinative measurement of an object point based on a measured distance to the object point and respective relative positions of the support and the targeting unit with respect to the vertical axis and tilt axis, respectively, and
a scan functionality for scanning of an object surface based on a continuous sweep of the measurement beam over the object surface by means of rotation of the beam deflection element whilst continuously measuring distance as well as respective relative position of the beam deflection element with respect to the deflection axis.

3. The surveying device according to claim 1, wherein for variation of the emission direction in a vertical plane, the tilt axis serves for a slow rotation and the deflection axis for a fast of rotation of the distance measurement beam.

4. The surveying device according to claim 1, wherein the targeting unit has a high positional precision and the deflection element has a comparatively low positional precision.

5. The surveying device according to claim 1, wherein the targeting unit comprises a small angle aperture and at least one wide angle aperture, differing in angle position and angle opening with respect to the tilt axis respectively deflection axis, the beam deflection element being rotatable in such a way that the distance measurement beam is emittable through both apertures.

6. The surveying device according to claim 5, wherein the targeting unit comprises a second wide angle aperture, situated opposite to the first wide angle aperture with respect to the deflection axis.

7. The surveying device according to claim 1, wherein the targeting unit is sized and arranged in such a way that it is rotatable at least 360° about the tilt axis.

8. The surveying device according to claim 1, wherein the beam deflection element is coupled to the tilt axis such that it follows a rotation about the tilt axis.

9. The surveying device according to claim 1, wherein the targeting unit comprises:
a position sensitive optical sensor for position-resolving light detection;
an on-axis camera sensor for providing a visual image of a targeting view of the targeting unit; or
an autofocus or a zooming unit for focusing or zooming with regard to the position sensitive optical sensor or the on-axis camera sensor.

10. The surveying device according to claim 1, further comprising:
a fine targeting or target tracking-functionality.

11. The surveying device according to claim 1, further comprising:
a spectral selective optical coating of the beam deflection element, whereby the coating is reflective for the distance measurement radiation and at least partly transparent for ambient light, laser light of a laser pointer or target illumination light.

12. The surveying device according to claim 1, wherein the support comprises:
the radiation source, or
an optical divergence element switchable into the distance measurement beam path for a change of divergence of the distance measurement beam.

13. The surveying device according to claim 1, wherein the distance measurement beam path has a common crossing point with the vertical axis and tilt axis.

14. The surveying device according to claim 1, further comprising:
a calibration functionality for compensation of deviations from an ideal orientation of the emission direction with an emission direction measurement using a calibrated position sensitive optical sensor situated in the targeting unit or an emission direction measurement unit situated in the base or support.

15. A method for measuring with a surveying device, the method comprising:
generating a distance measurement beam;
emitting the distance measurement beam into free space in an emission direction;
varying the emission direction with respect to a vertical axis as a first axis of rotation and a tilt axis as a second axis of rotation;
determining the emission direction based on:
a measured relative position with respect to the vertical axis, and
a measured relative position with respect to the tilt axis;
varying the emission direction with respect to a deflection axis as a third axis of rotation, the deflection axis being congruent to the tilt axis; and
determining the emission direction based on a measured relative position with respect to the deflection axis.

* * * * *